United States Patent Office 3,310,323
Patented Mar. 21, 1967

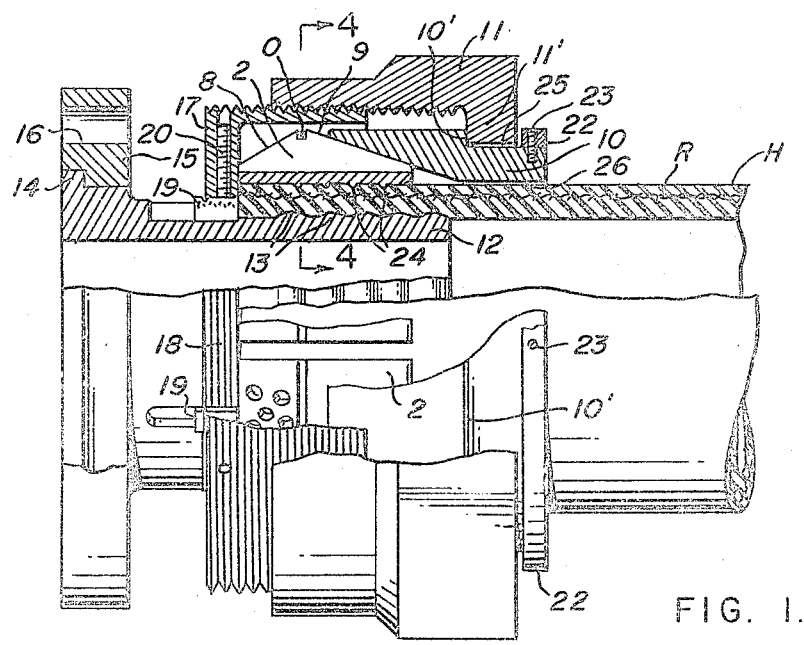
FIG. 1.
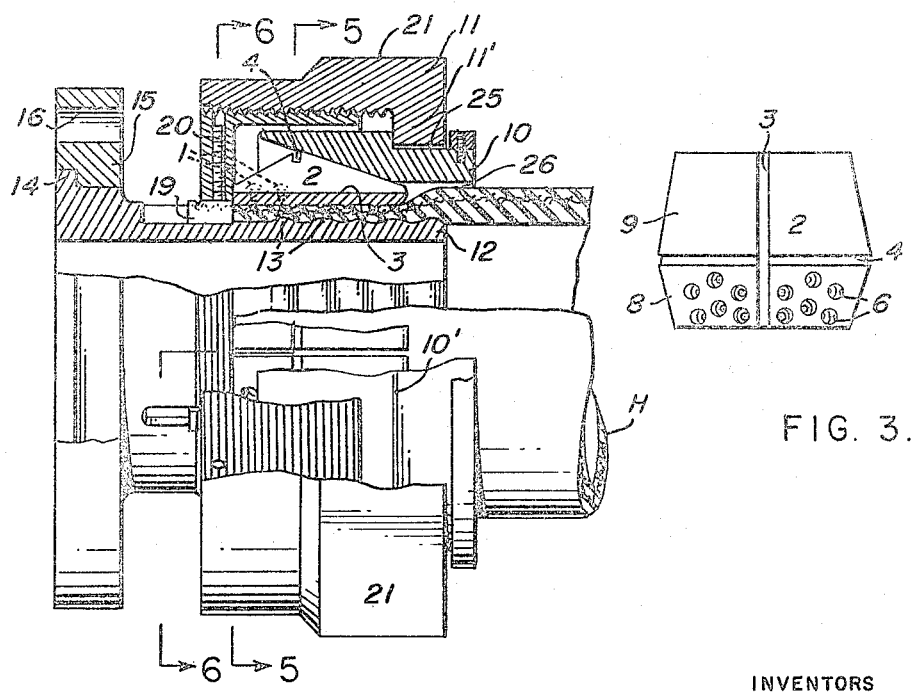
FIG. 2.
FIG. 3.
INVENTORS
FREDERICK M. GALLOWAY
GODFREY J. RITTENHOUSE
ROBERT H. SINNAMON
BY
ATTORNEY

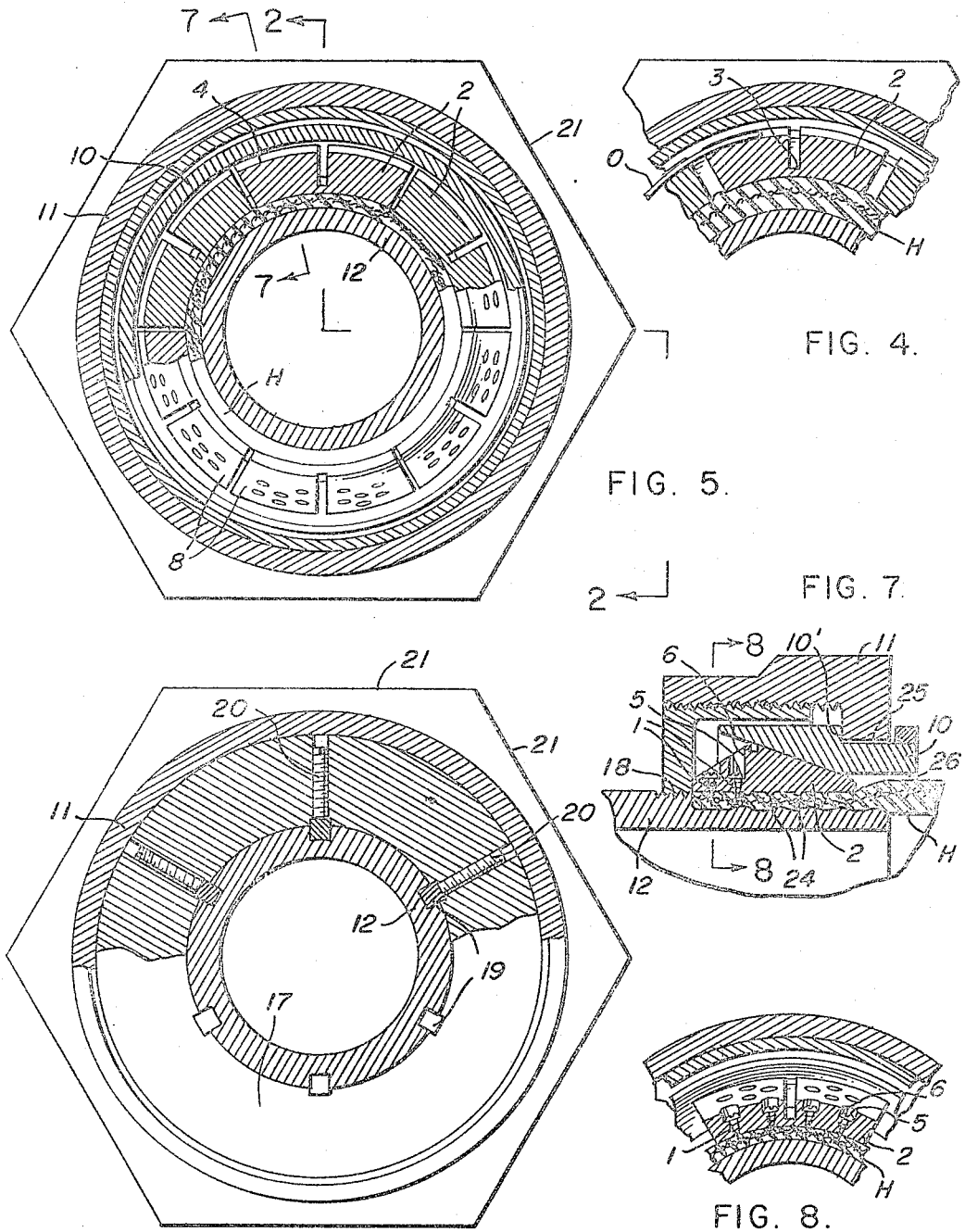

3,310,323
HIGH PRESSURE HOSE CONNECTOR
Frederick M. Galloway, Coraopolis, Godfrey J. Rittenhouse, Feasterville, and Robert H. Sinnamon, Huntingdon Valley, Pa., assignors to H. K. Porter Company, Inc., Pittsburgh, Pa., a corporation of Delaware
Filed Oct. 16, 1964, Ser. No. 404,245
3 Claims. (Cl. 285—249)

This invention relates to hose couplings or connectors particularly for use with that type of high pressure hose now largely replacing steel pipe lines in situations in which vibration and shock with resultant metal fatigue render hazardous the use of all-metal pipe lines. The incidence of metal fatigue in high pressure metal pipe has been noted especially in submarine and surface naval vessels in which operational accessories often cause severe vibration and shock as when ordnance is discharged for training purposes or in combat, a reason, among others, why flexible hoses of reinforced synthetic elastomeric materials are becoming more and more into use to conduct sea water on shipboard, as for condenser cooling and other purposes, while their resistance to the corrosive effects of sea water affords further advantage over metallic conduit systems.

It is therefore a principal object of the invention to provide an improved hose connector or coupling for heavy duty flexible hose whereby a hose section may be connected to a fitting on either another hose section or a tank, bulkhead or the like into or from which water or other fluid under pressure is to be conducted by the hose.

A further object is to provide a connector or coupling comprising wedge segments which when permanently secured to the end of a hose can be utilized to clamp the hose wall securely to an internal nipple by longitudinal or axial movement of a cooperative internally frusto conical clamping ring under the influence of the rotative movement of a threaded locking ring coaxial and cooperative therewith.

A still further object is the provision of a connector or coupling of novel construction such that when assembled with a hose the end portion of the latter extends and is clamped between rigid cylindrical elements in such manner that substantially like pressure is exerted on the hose throughout its periphery irrespective of slight variations in the thickness of the wall of the hose, thereby insuring a tight, leak-proof seal between the hose and the coupling.

Other objects, purposes and advantages of the invention will hereinafter more fully appear or will be understood from the following description of a preferred embodiment of it, reference being had to the accompanying drawings in which:

FIG. 1 is a side elevation including a fragmentary radial section of the coupling as initially applied to a hose;

FIG. 2 is a generally similar view of the coupling after securement to the hose;

FIG. 3 is a plan view of one of the wedge segments utilized in the coupling but shown as separated therefrom;

FIG. 4 is a fragmentary transverse section of the coupling and hose assembly taken on line 4—4 in FIG. 1;

FIG. 5 is a transverse staggered section on line 5—5 in FIG. 2, the line 2—2 in FIG. 5 designating the plane section of FIG. 2;

FIG. 6 is a transverse staggered section on line 6—6 in FIG. 2;

FIG. 7 is a fragmentary radial section on line 7—7 in FIG. 5, and

FIG. 8 is a fragmentary transverse section on line 8—8 in FIG. 7.

Referring now more particularly to the drawings it will be appreciated that hose H illustrated is to be deemed as typical of the many specifically different types of high pressure hose composed of an elastomeric wall of substantial thickness in which is embeded a fibrous textile reinforcement R usually comprising several plies. This hose, though in the general category of flexible hoses, is quite rigid and not readily collapsible even when free from internal pressure and its wall is of such density as to receive and retain wood screws 1 when driven into it to hold assembled with the hose preparatory to securement to the coupling structure generally a plurality of wedge segments 2 which are spaced circumferentially uniformly about the hose end. Depending on the diameter of the hose a greater or fewer number of wedge segments are employed, usually five for a hose of nominal 2½" diameter, six for 3" and 4" hoses and a larger number for larger sizes up to 16–18 for nominal 16" hose. Each segment has a groove 3 extending parallel to the hose axis when its inner curved surface is engaged with the outer surface of the hose to thereby afford a certain slight transverse flexibility enhancing the capacity of the segment to conform to the hose, while a ceinture groove 4 in the segment normal to groove 3 facilitates aligning a plurality of the segments transversely when they are being assembled with and secured to the hose itself, an elastic O-ring O ordinarily being seated in grooves 4 in the several segments to afford temporary yielding restraint to them so they may be uniformly spaced circumferentially of the hose and held in position thereby while screws 1 are being driven home, the heads 5 of the latter being housed in counterbores 6 in the segments.

The outer frusto conical surfaces 8, 9 of the segments oppositely directed from groove 4 are desirably formed to include angles of about 32° and 20° respectively to the hose axis, the forward surface 9 more remote from the hose end than surface 8 on each segment being complementary to a corresponding portion of the inner frusto conical surface of a clamping ring 10 disposed loosely on the hose preferably before the wedge segments are attached to it; this ring is reduced in diameter at its rear end to provide a shoulder 10'.

The foregoing parts of our coupling have been first described in order to emphasize one of its outstanding characteristics whereby wedge segments permanently secured to the hose by screws embedded in its wall are engaged by a clamping ring which is moved axially to compress the segments radially inward when a cooperative internally threaded locking collar 11 having a preferably annular inwardly directed flange 11' aligned and cooperative with shoulder 10' is rotated relatively to the clamping ring and segments.

Interiorly of the hose when assembled therewith and in common with hose couplings heretofore known, our coupling comprises a cylindrical nipple 12 adapted for reception in the end of the hose having circumferential beads 13 on its outer surface against which the segments force the hose wall when they are contracted radially inward, the beads thus forced into the elastomeric inner lining of the hose preventing relative radial or axial movement of the hose and nipple. Seated on nipple 12 in relatively rotatable relation behind a circumferential rib 14 is a flange 15 having spaced holes 16 into which bolts or the like for securing it to another like flange or other structure may pass. Inwardly of this flange nipple 12 carries a skirted collar 17 threaded on the exterior of its skirt and also threaded at 18 on the nipple and fixed thereto by spaced keys 19 locked in place by set screws 20, collar 17 receiving locking collar 11 whereby when it is rotated as by a wrench applied to opposed flats 21 of its preferably polygonal outer surface it, through cooperation of flange 11' with shoulder 10', drives clamping ring 10 forward relatively to the nipple to thereby compress the wedge segments radially inward against the hose. Outwardly of flange 11' a retaining ring 22 is mounted on clamping ring 10 and secured thereto by set screws 23 whereby when the coupling is to be disassembled retraction of the locking ring withdraws the clamping ring from engagement with the wedge segments and thereby relieves pressure of the hose against nipple 12.

As will be evident from the foregoing when our coupling is to be applied to the end of a hose H the clamping ring 10, preferably pre-assembled with locking collar 11 and retaining ring 22 is passed over the end of the hose to a point sufficiently remote from its extremity to allow wedge segments 2 to be applied thereto, these being temporarily but adjustably held in place around the hose end by elastic O-ring O seated in grooves 4 in the segments. When the latter have been uniformly disposed about the hose wood screws 1 are inserted successively through counterbores 6 in the several segments and driven home in the carcass of the hose, the screws terminating preferably appreciably short of the inner surface of the hose lining so as not to puncture it. The screws, particularly for salt water service, are desirably highly corrosion resistant even though they do not contact the contents of the hose and when incorporated in the coupling are more or less shielded from ambient fluids and gases; we prefer therefore to employ screws made from "Monel" metal or other strong corrosion resistant alloy, especially when the segments with which they are in contact when in service are made from aluminum-bronze or the like.

After the screws have been driven home O-ring O, having served its purpose, is normally removed and nipple 12, preferably pre-assembled with flange 15 and collar 17, is next inserted in the hose, the undulations in the hose caused by beads 13 on nipple 12 in general complementing those impressed on the outer surface of the hose by circumferential ribs 24 on the inner surfaces of wedge segments 2. After insertion of the nipple in the hose clamping ring 10 is brought into engagement with the tapered faces of the segments as locking collar 11 is threaded onto and rotated on collar 17; clamping ring 10 thus through interaction of flange 11' and shoulder 10' progressively squeezes the segments inwardly due to its relative axial movement. The hose is thereby firmly clamped to nipple 12 and as segments 2 are contained at least partially within the tapered clamping ring 10 and secured by screws 1 to the hose relative axial movement of these parts tending to separate them only clamps the hose more tightly between the segments and the nipple since the segments are constrained by screws 1 to move with the hose and their outer tapered surfaces are engaged by clamping ring 10 to vector axial movement into intense radial inward pressure against the segments and hence against the hose.

A marked advantage of our coupling over all other couplings of which we are aware resides in the fact that because of a slight clearance 25 provided between the radially inwardly directed flange 11' of collar 11 and ring 10 and a like one 26 between the bore of the latter and the outside of the hose the ring is free to "float," if it may be so termed, between the flange and hose as it is moved forwardly by rotation of the ring with the result that if the radius of the outer surface of the hose is greater or less in the vicinity of one or more of the wedge segments than in the vicinity of one or more of the others, in short if the thickness of the hose wall is not constant, the ring can adjust itself to accommodate such variation with consequent application of substantially equal pressure to all the segments thereby insuring a tight seal between the hose and nipple 12 against which it is forced by the operation of the segments as they are driven radially inward by the forward movement of the ring, the interengagement of the annular plane surfaces of shoulder 10' on the clamping ring and the flange 11' and the clearance 25 affording limited movement transversely to its axis of the clamping ring 10 relatively to the locking ring or collar 11.

While we have herein illustrated and described with considerable particularity a preferred embodiment of our invention we do not thereby desire or intend to restrict ourselves specifically thereto as within the scope of the appended claims the design, construction and method of assembly of the various elements comprised in our coupling are capable of modification in various particulars from those to which we have especially referred.

Having thus described our invention we claim and desire to protect by Letters Patent of the United States:

1. A hose and coupling assembly of the character described comprising a hose, a nipple seated in the hose coaxial therewith and engaging its inner wall, a plurality of circumferentially spaced wedge segments having inner surfaces substantially congruent with the outer surface of the hose disposed about its periphery, a plurality of screws extending through each of said segments and into the hose wall through a substantial proportion of the thickness thereof, an internally frusto conical clamping ring surrounding segments, and means cooperative with but independent of the ring for moving it axially relative to the segments to thereby force them radially inward to clamp the hose against the nipple.

2. A hose and coupling assembly as specified in claim 1 in which the means for moving the clamping ring comprise an internally threaded collar surrounding the ring having an inwardly directed flange, a shoulder on the ring engageable by said flange, and a collar carried by the nipple having an exteriorly threaded skirt adapted for cooperation with the threads on the first collar.

3. A hose and coupling assembly as specified in claim 2 in which the flange is of greater internal diameter than the outer diameter of the clamping ring proximate said shoulder and the clamping ring is of greater internal diameter than the outer diameter of the hose whereby to afford capacity for radial movement of the clamping ring between the hose and the flange as the first collar is screwed onto the skirt.

References Cited by the Examiner

UNITED STATES PATENTS

| | | | |
|---|---|---|---|
| 802,853 | 10/1905 | Garner et al. | 285—246 |
| 1,209,887 | 12/1916 | Rothenbucher | 285—414 X |
| 2,230,115 | 1/1941 | Kreidel | 285—248 |
| 2,245,101 | 6/1941 | Cole | 285—174 |
| 2,480,496 | 8/1949 | Mercier | 285—414 X |
| 2,547,889 | 4/1951 | Richardson | 285—354 X |
| 2,838,073 | 6/1958 | Di Mattia et al. | 285—404 |
| 3,156,491 | 11/1964 | Jackson et al. | 285—243 |
| 3,191,975 | 6/1965 | La Marre et al. | 285—243 |
| 3,222,091 | 12/1965 | Marshall | 285—243 X |

FOREIGN PATENTS

| | | |
|---|---|---|
| 536,629 | 1/1957 | Canada. |
| 380,542 | 9/1923 | Germany. |
| 3,454 | 1895 | Great Britain. |

CARL W. TOMLIN, *Primary Examiner.*

THOMAS F. CALLAGHAN, *Examiner.*